May 3, 1966 N. L. STAUFFER 3,249,007
AUTOMATIC FOCUSING PHOTOGRAPHIC PROJECTOR
Filed March 26, 1964 2 Sheets-Sheet 2

INVENTOR.
NORMAN L. STAUFFER
BY Arthur H. Swanson
ATTORNEY.

United States Patent Office 3,249,007
Patented May 3, 1966

3,249,007
AUTOMATIC FOCUSING PHOTOGRAPHIC
PROJECTOR
Norman L. Stauffer, Englewood, Colo., assignor to
Honeywell Inc., a corporation of Delaware
Filed Mar. 26, 1964, Ser. No. 355,040
4 Claims. (Cl. 88—28)

This application is a continuation-in-part of copending application Serial No. 286,708, filed on June 10, 1963.

This invention is concerned with a photographic projector having automatic focusing means which function to maintain a constant distance between the slide, which is to be projected, and the objective lens, which throws an image of the slide on a screen or other exhibiting surface.

This automatic focus is achieved by an optical-sensing arrangement which focuses a pattern of light at the plane of the slide and re-images the reflected portion of this pattern on a pair of photocells which are responsive to the position of this re-image. The rebalance of the optical-sensing system is achieved by coupling the objective lens to either the source of light, the pair of photoelectric cells, or an intermediate mirror by a system of cams or levers which return the re-image of the slide to a point at which the effect of this re-image on the cells is equal.

It is an object of this invention to provide automatic means for focusing a photographic projector using levers or cams to alter the position of optical elements.

It is a further object of this invention to provide means for automatically focusing a photographic projector in which the means for altering the position of an optical element is movable at a proper ratio to return the re-image or spot to a null or intermediate position at which the photocells are equally affected when the projection lens has moved the proper distance to restore good focus.

This invention relates to an optical means to sense the position of the slide to be projected along the optical axis and to maintain a given distance between the slide and the objective lens of the projector. By this means, proper focus is maintained.

Specifically, this invention provides an arrangement in which a first means forms an image of a source of radiation at the plane of the slide. A second means is provided to re-image the reflected energy, which is reflected from the slide, and focus this reflected energy on differential energy-sensing means, this last-mentioned means being responsive to the position of this re-image reflected energy. This second means employs the cams or levers to reposition the re-image reflected energy. A third means is also provided which is responsive to the differential energy-sensing means and which is connected to reposition the objective lens to a position of proper focus and also to reposition the re-image of the reflected energy at the null or balance point, at which point the differential energy-sensing means are equally effective.

This invention will be apparent to those skilled in the art upon reference to the following specification, claims, and drawings, of which:

Figure 1:
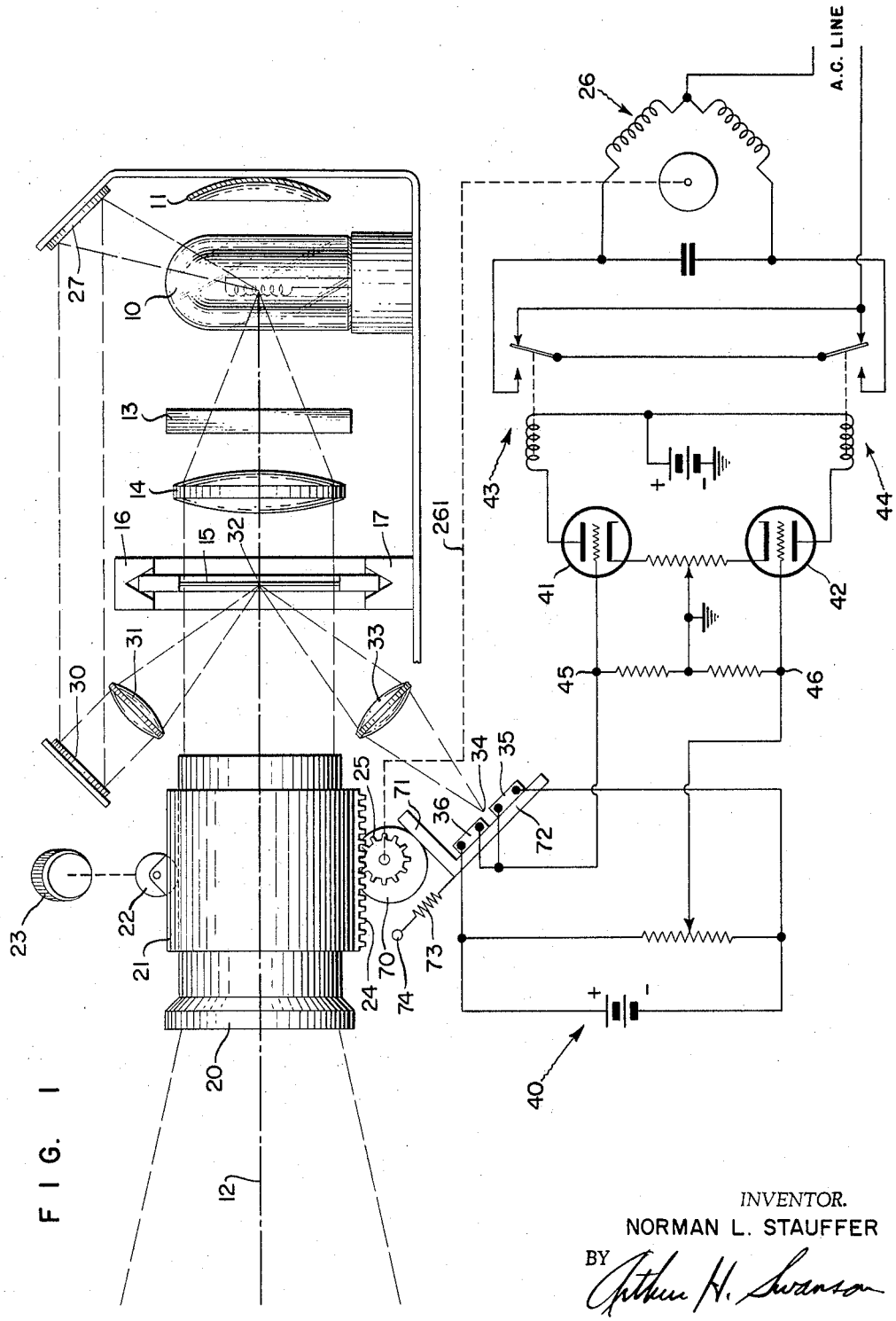
FIG. 1 is a diagrammatic or schematic showing of an automatic focusing arrangement according to the present invention in which the differential energy-sensing means are repositioned by means of a cam and a level.

Referring to FIG. 1, reference numeral 10 designates a projection bulb which is associated with the reflector 11 to direct light generally down an optical axis identified by broken line 12. Bulb 10 is shown to include an incandescent filament which, for purposes of simplicity, is considered to be a point source of light.

The light or radiant energy generated by the bulb 10 passes through an optical member comprising a filter or heat-glass 13. This member 13 possesses selective radiant energy transmission properties and in a sense "cools" the light generated by bulb 10. The major portion of the radiation from the bulb 10 lies in the infra-red region, in the vicinity of 1 micron. The visible region is normally considered to exist from 0.4 to 0.7 micron, with the ultra-violet region lying below 0.4 micron. The illumination at the slide 15, as controlled by the heat-glass 13, contains as a major portion thereof visible radiation. A certain amount of ultra-violet radiation passes on to the slide and a small portion of the infra-red radiation passes on to the slide to heat the slide.

Referring again to FIG. 1, reference numeral 14 identifies generally a condensing lens which controls the radiation emitted from bulb 10 to illuminate the slide 15 positioned in a pair of stationary slide guides 16 and 17. The illuminated slide is then focused on a screen or the like by means of a movable objective lens 20 which is movably held in a holder 21, holder 21 carrying a friction wheel 22 connected to a manual focus knob 23. Knob 23 is effective to move objective lens 20 within its holder 21. Knob 23 is shown as manually operable to focus objective lens 20. In fact, this focus, adjusting means might be a remote control; e.g., a switch which is effective to cause rotation of the friction wheel 22 by energization of a reversible electric motor (not shown). The holder 21 includes a gear rack 24 which meshes with a gear 25 to cause movement of holder 21 and of objective lens 20, as a unit, along optical axis 12 under the control of a reversible A.C. motor 26, this motor being controlled in a manner to be described.

It is the intention that objective lens 20, slide guides 16 and 17, condensing lens 14, heat-glass 13, bulb 10 and reflector 11 be representative showings of conventional components to be found in photographic projectors.

For purposes of simplicity, these components have been shown somewhat diagrammatically.

It is further intended that the operation of this projector may be manual, semi-automatic, or automatic.

As will be readily appreciated, the stationary slide guides 16 and 17 define a generally vertical plane, which is generally perpendicular to optical axis 12, at which slide 15 is adapted to be positioned. An essential feature of this invention utilizes the concept of focusing a pattern of radiant energy at the plane defined by slide guides 16 and 17, and to then re-image this pattern at radiation-sensitive means which is sensitive to the position of this re-image pattern. Motive means are then energized by the radiation-sensitive means to reposition the objective lens along its optical axis 12, and to also reposition a further means to provide repositioning of the re-image pattern on the radiation-sensitive means.

FIG. 1 provides a pair of mirrors 27 and 30 which are constructed and arranged to pick up radiant energy from bulb 10 which is not filtered by heat-glass 13, and is, thus, rich in the infra-red portion of the spectrum. This source of radiant energy, having a characteristic which is different from the characteristic of the energy which illuminates slide 15, is controlled by a first lens 31, which focuses an image of the source (in this case bulb 10) at a spot 32 in a plane defined by the slide guides 16 and 17 and occupied by a slide 15 in its "flat" condition. That is the condition of the slide when it has not crept, buckled, or popped. Furthermore, lens 31 and its associated components are arranged to project this image, in focus, at spot 32, and at an angle to the optical axis 12 of the projector. Thus, the radiant energy of the second characteristic (rich in infra-red) is reflected from the surface of the slide and refocused (re-imaged) by a second lens 33 at a point 34 adjacent radiation-sensitive means in the form of a pair of closely-spaced photoelectric cells 35 and 36.

It should be mentioned at this point that photoelectric cells 35 and 36 may be constructed to be sensitive primarily to an infra-red or second-characteristic radiant energy. Also, filter means may be associated with photoelectric cells 35 and 36 to impart this property to these photoelectric cells.

Photoelectric cells 35 and 36 are connected to motive means in the form of D.C. bridge circuit 40, a pair of electron-discharge devices 41 and 42, and relays 43 and 44, the switches of the relays being connected in controlling relation to windings of the reversible A.C. motor 26. Specifically, photoelectric cells 35 and 36 are photo-resistive devices whose impedance varies with the amount of illumination impinging upon the cells. When spot 34 exists at a point between the cells, the cells are equally illuminated and have approximately equal resistance so that the voltage provided at the input electrodes of discharge devices 41 and 42, these input points being terminals 45 and 46, is approximately zero. As point 34 shifts onto one of the cells and away from the other cell, one of the discharge devices 41 and 42 conducts to the point where its relay is energized and the motor 26 is driven in a proper direction to re-establish focus of the objective lens on the slide and to reposition spot 34 at the point between the photoelectric cells which approximately equally illuminates the photoelectric cells.

Reversible A.C. motor 26 has a mechanical or other connection 261 by means of which motor 26 is able to drive gear 25, gear rack 24, holder 21, and objective lens 20. This action moves objective lens 20 along its optical axis 12 until the projector is again in proper focus.

Gear 25 has mounted thereon and movable therewith a cam 70, which engages with an arm 21 of an L-shaped lever having a second arm 72 on which the photoelectric cells 35 and 36 are mounted. L-shaped lever 71-72 is mounted for movement toward and away from the axis of cam 70 by a slide (not shown) under the action of a spring 73 which is attached at one end to the L-shaped lever 71-72 and which is attached at its opposite end 74 to a stationary part of the projector.

The invention can best be understood by considering a condition of operation, with reference to FIG. 1. Initially the slide 15, which is positioned at the optical axis 12, is relatively cool and exists in a "flat" condition, as shown in FIG. 1. The operator of the projector then controls the knob 23 manually or by means of a remote control, thus moving objective lens 20 along the optical axis 12 and within the stationary holder 21 to produce a sharp and clear focus of the image of the slide on the screen. The temperature of this slide then increases as it remains within the slide guides 16 and 17. The heating of the slide causes it to expand, to creep, to pop, or to move to a buckled position. Lens 31 continues to focus a pattern or spot at point 32. However, the light provided by this optical system continues along its inclined axis, striking the new position of the slide at a different position. Insofar as the optical system, including lens 33, is concerned, the apparent image of spot 32 has now shifted. As a result of this shifting, the optical system including lens 33 causes the re-image of the pattern or spot to illuminate the photocell 36 more than the photocell 35 is illuminated. As a result, terminal 45 becomes more positive, discharge device 41 conducts to energize relay 43, and motor 26 runs in a direction to cause connection 261 to operate the objective lens holder 21 to move it to the right, as seen in FIG. 1, moving with it the objective lens 20. In order to maintain focus on the now buckled slide, it is necessary that the movement of the objective lens 20, carried by holder 21, be stopped. In order to accomplish this, cam 70 actuates L-shaped lever 71-72, which carries photoelectric cells 35 and 36 on it, in a suitable direction to cause the point 34 to occupy a position between the cells 35 and 36 at which the cells are equally illuminated and have approximately equal resistance. At this point, further movement of motor 26 ceases and the objective lens 20 has been moved to a position of proper focus.

Figure 2:
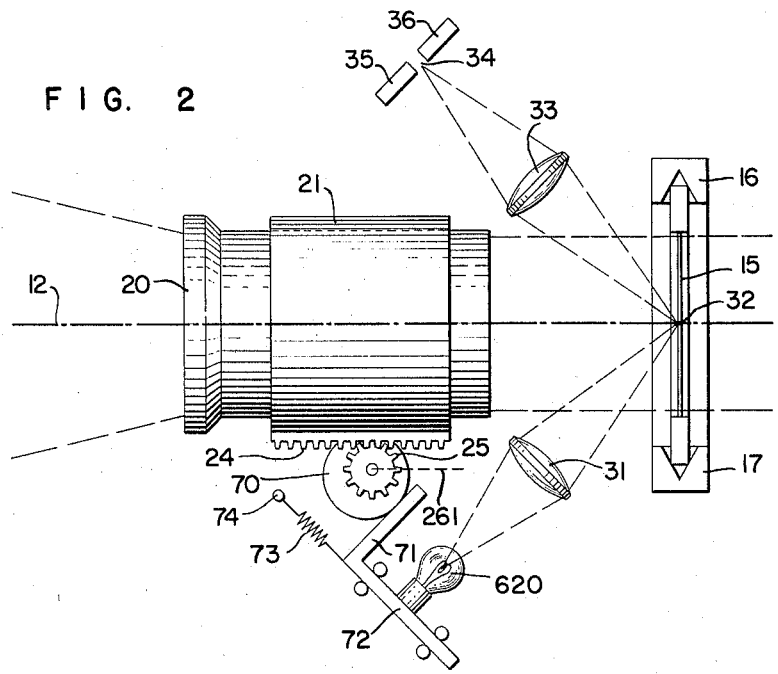
FIG. 2 is a showing of a modification of the arrangement of FIG. 1.

In FIG. 2, there is shown a modification wherein objective lens 20 is refocused by moving a source of radiation of the second characteristic identified by the reference numeral 620. In this case, the source 620 is mounted on the L-shaped lever 71-72, and lens 31 focuses an image of source 620 at point 32 on slide 15. In the modification of FIG. 2, the repositioning of the re-image at point 34 is achieved by movement of source 620 relative to lens 31. This movement of source 620 causes spot 34 to move to a position between the cells 35 and 36 at which position the cells are equally illuminated and have approximately equal resistance so that the voltage provided at the input electrodes of the discharge devices 41 and 42, these input points being terminals 45 and 46, is approximately zero.

Figure 3:
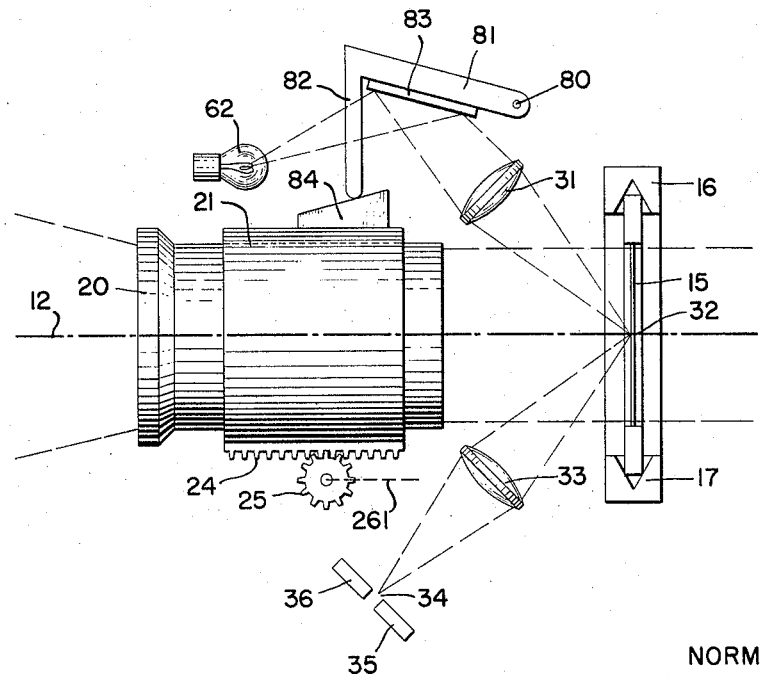
FIG. 3 is a showing of another modification of the arrangement of FIG. 1.

FIG. 3 shows a modification of this invention in which the objective lens 20 is refocused by means of an intermediate mirror. In this modification, a stationary source of radiation of the second characteristic is identified by the reference numeral 62. Radiation of the second characteristic from source 62 is reflected by intermediate mirror 83 onto fixed lens 31 which projects its image, in focus, at spot 32, and at an angle to the optical axis 12 of the projector. This radiant energy is reflected from the surface of the slide 15 and is refocused (re-imaged) by second lens 33 at a point 34 adjacent radiation-sensitive means; e.g., photoelectric cells 35 and 36. Intermediate mirror 83 is mounted on a fixed pivot 80 by means of an L-shaped lever 81-82 which engages with a slide 84 mounted on and movable with the objective lens holder 21. Motor 26 runs in a direction to cause the objective lens holder 21 to move in such a way as to carry with it the objective lens 20 and the slide 84 which rocks the intermediate mirror 83 and varies the direction of radiation from the source 62 which is focused at the point 34 adjacent the photocells 35 and 36. Movement of the objective lens 20 in the proper direction and by the proper amount re-images the apparent position of the pattern or spot of light at the point 34 to equally illuminate the photoelectric cells 35 and 36, and, thus, "satisfy" the motive means including the motor 26 and, thereby, stop rotation of the motor 26 at a point at which the objective lens 20 is in proper focus.

What is claimed is:

1. In combination with a photographic slide projector having a movable objective lens which is movable to focus a projected image of a slide on a screen or the like, the improvement including, means to maintain a given lens-to-slide distance, including: first means to form an image of a radiation source at the normal plane of the slide; second means to re-image the reflected image of the radiation source on differential radiation-sensing means responsive to the position of said re-image thereon; third means controlled by said sensing means to move the objective lens; and characterizing means controlled by said third means and operating at such a ratio with respect to the movement of the objective lens as to move at least a portion of one of said first and said second means to restore the relative position of said re-image and said sensing means so that the effect of said re-image on the differential portions of said sensing means is substantially equal as the slide moves from said normal plane due to buckling or any change in position of the slide.

2. A combination as specified in claim 1, wherein said second means includes said radiation-sensing means, and wherein said portion is said radiation-sensing means.

3. A combination as specified in claim 1, wherein said first means includes a radiation source, and wherein said portion is said radiation source.

4. A combination as specified in claim 1, wherein said first means includes intermediate reflecting means to deflect radiation from the radiation source, and wherein said portion is said intermediate means.

References Cited by the Examiner

UNITED STATES PATENTS

| | | | |
|---|---|---|---|
| 2,947,215 | 8/1960 | Mitchell | 88—24 |
| 3,037,423 | 6/1962 | Shurcliff | 88—26 |
| 3,205,766 | 9/1965 | Dewald et al. | 88—24 |

FOREIGN PATENTS

| | | |
|---|---|---|
| 903,962 | 10/1945 | France. |
| 823,404 | 11/1959 | Great Britain. |

OTHER REFERENCES

VEB, German application No. 1,127,617, published Apr. 12, 1962 (1 sht. dwg., 2 pp. spec.) (Kl. 42h 23/26) (G 03b).

NORTON ANSHER, *Primary Examiner.*